2 Sheets--Sheet 1.

J. K. SAX & G. W. KEAR.
Tire-Heating Furnaces.

No. 147,287.  Patented Feb. 10, 1874.

WITNESSES.  INVENTORS
  John K. Sax.
  George W. Kear.
By Leggett & Leggett
  Attorneys.

J. K. SAX & G. W. KEAR.
Tire-Heating Furnaces.

No. 147,287. Patented Feb. 10, 1874.

WITNESSES.
W. T. Newman,
Wm. H. Brereton

INVENTORS
John K. Sax.
Geo. W. Kear.
By Leggett & Leggett
Attorneys.

UNITED STATES PATENT OFFICE.

JOHN K. SAX AND GEORGE W. KEAR, OF PITTSTON, PENNSYLVANIA.

IMPROVEMENT IN TIRE-HEATING FURNACES.

Specification forming part of Letters Patent No. 147,287, dated February 10, 1874; application filed January 8, 1874.

*To all whom it may concern:*

Be it known that we, JNO. K. SAX and GEO. W. KEAR, of Pittston, in the county of Luzerne and State of Pennsylvania, have invented certain new and useful Improvements in Furnaces; and we do hereby declare the following to be a full, clear, and exact description of the invention, such as will enable others skilled in the art to which it pertains to make and use it, reference being had to the accompanying drawings, which form part of this specification.

Our invention relates to an improvement in furnaces for heating annular tires, and other articles of the same nature that require to be carefully and uniformly heated; and consists in the combination of devices and appliances as hereinafter set forth and claimed.

Figure 1:
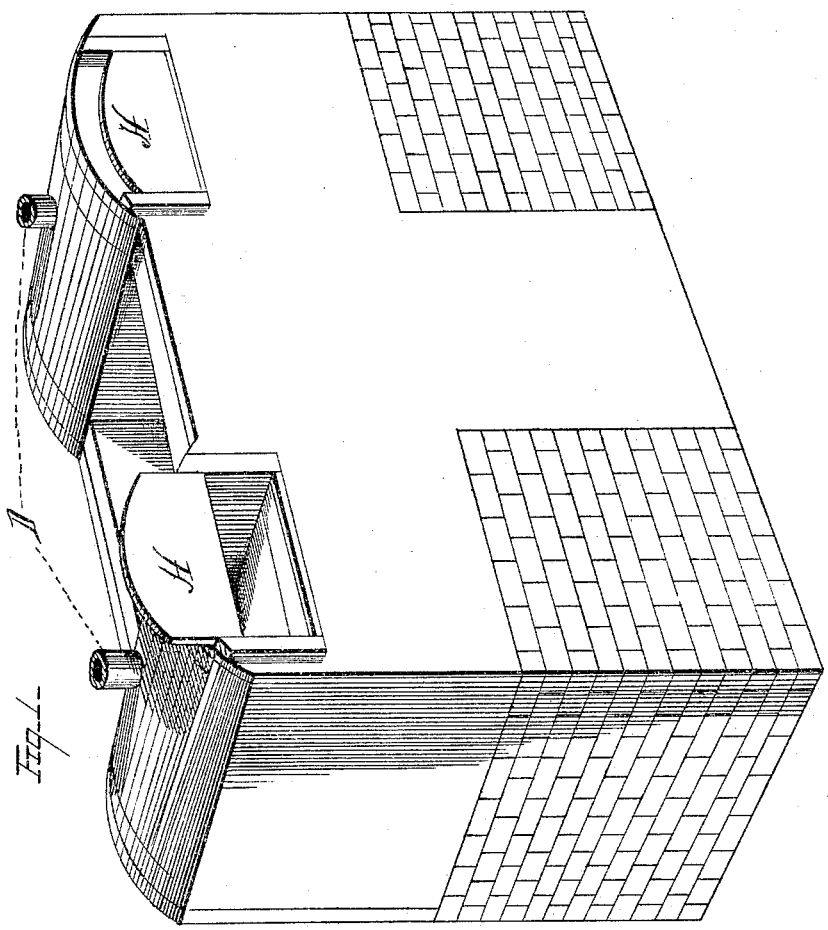
Figure 2:
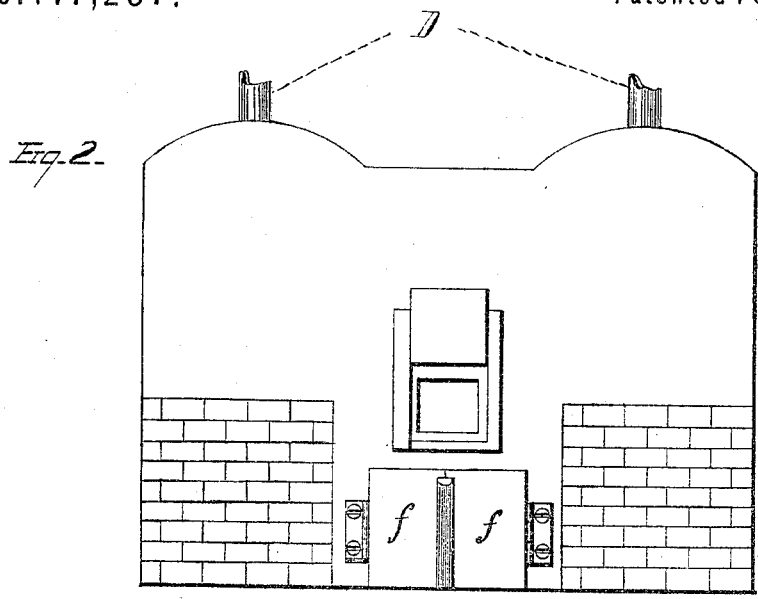
Figure 3:
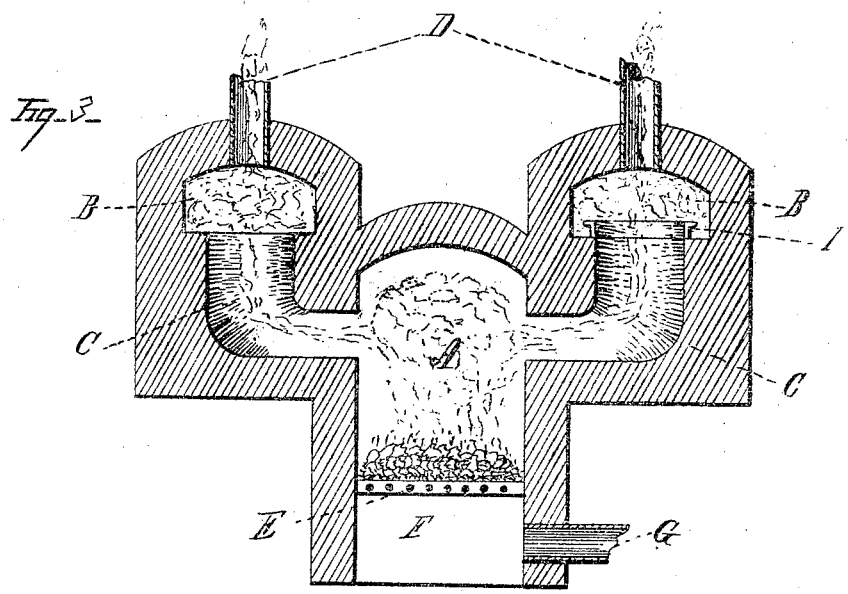

In the drawings, Figure 1 is a view in elevation of the front of the furnace, showing the doors through which the tires to be heated are inserted. Fig. 2 is a view of the back of the furnace, showing the furnace-door and the door to the ash-pit. Fig. 3 is a central vertical section taken parallel with the front of the furnace.

A is a furnace, situated centrally and beneath two or more heating-chambers, B B. C C are flues, through which the products of combustion pass from the furnace A to the heating-chambers B. D D are chimney-flues, provided with suitable dampers, regulating the exit of the heat from the heating-chambers B B. E is a grate, beneath which is the ash-pit F, closed in by the doors *f*. G is a tuyere for supplying any desired blast beneath the grate E to the furnace A. H H are doors, into which the tires to be heated are inserted, and placed in proper position encircling the flue C, after which they are closed. The interior of the furnace, the flues, and the heating-chambers are lined with suitable non-conducting material that will resist the heat, and their surfaces are so arched or domed as to give a uniform reverberation of the heat. It is well known that tires must be heated uniformly, else one portion will be too much heated before other portions are brought to the proper degree of heat, and, moreover, a steel or iron tire, like those that are employed in car-wheels, wherein the body of the wheel is cast within the tire, should be heated not only uniformly, but to a greater degree upon the inside of the tire than upon the outside, in order to facilitate welding. To that end this furnace is especially adapted.

The operation of the device is as follows: A door, H, is opened, and the tire I is placed within the heating-chamber B, and made to encircle the flue C. The door is then closed, and heat is admitted into the heating-chamber. The degree of heat is governed by the amount of blast through the tuyere G, and the operation of suitable dampers in the flues D. As the heat enters the chamber B it comes in direct contact with the interior surface of the tire. If the heat is not strong enough it may be increased by a blast through the tuyere G. The outer walls of the device are constructed of iron, or other suitable material.

Having thus fully described our invention, what we claim as new, and desire to secure by Letters Patent, is—

1. The tire-heating device composed of heating-chambers B, and centrally-located furnace A, and connecting-flues C, all substantially as described.

2. The combination of the furnace A E F, provided with the tuyere G, the heating-chambers B, connecting-flues C, doors H, and exit-flues D, substantially as and for the purpose described.

In testimony that we claim the foregoing we have hereunto set our hands this 3d day of January, 1874.

JOHN K. SAX.
GEORGE W. KEAR.

Witnesses:
R. DEAN,
ALFRED DARTE, Jr.